(12) United States Patent
Baxter et al.

(10) Patent No.: US 8,342,382 B2
(45) Date of Patent: Jan. 1, 2013

(54) DETERMINING THE QUALITY OF A FRICTION WELD USING A DOUBLE DIFFERENTIAL

(75) Inventors: Gavin J Baxter, Sheffield (GB); Mark G Horwell, Taranaki (NZ); Simon E Bray, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/021,245

(22) Filed: Feb. 4, 2011
(Under 37 CFR 1.47)

(65) Prior Publication Data
US 2012/0012644 A1 Jan. 19, 2012

(30) Foreign Application Priority Data

Feb. 18, 2010 (GB) .................................. 1002717.5

(51) Int. Cl.
*B23K 31/12* (2006.01)
*B23K 20/12* (2006.01)
(52) U.S. Cl. ..................................... 228/103; 228/112.1
(58) Field of Classification Search ...................... 700/69
See application file for complete search history.

(56) References Cited

U.S. PATENT DOCUMENTS

| | | | | |
|---|---|---|---|---|
| 3,678,566 | A * | 7/1972 | Ellis et al. | 228/102 |
| 3,998,373 | A * | 12/1976 | Jones et al. | 228/2.3 |
| 4,067,490 | A | 1/1978 | Jones et al. | |
| 4,757,932 | A | 7/1988 | Benn et al. | |
| 6,105,849 | A * | 8/2000 | Mochizuki et al. | 228/112.1 |
| 6,232,572 | B1 | 5/2001 | Kanjo | |
| 6,727,691 | B2 * | 4/2004 | Goldfine et al. | 324/240 |
| 6,808,931 | B1 * | 10/2004 | Wang et al. | 436/83 |
| 6,909,459 | B2 * | 6/2005 | Watson et al. | 348/229.1 |

(Continued)

FOREIGN PATENT DOCUMENTS

DE 199 17 896 A1 10/1999

(Continued)

OTHER PUBLICATIONS http://www.phaser.com/modules/students/salmon/R2.pdf; Apr. 12, 2004.*

(Continued)

*Primary Examiner* — Kiley Stoner
*Assistant Examiner* — Carlos Gamino
(74) *Attorney, Agent, or Firm* — Oliff & Berridge, PLC

(57) ABSTRACT

A method of determining the quality of a friction weld between two components, the method comprising joining two components together using a friction welding process, measuring the loss of length of the components as a function of time during the friction welding process, determining the double differential with respect to time of the loss in length of the components as a function of time, determining the quality of the friction weld by calculating the $R^2$ value of the linear fit to the loss in length of the components as a function of time over a defined time period, determining the end of the defined time period by identifying the start of the final positive peak of the double differential with respect to time of the loss of length of the components as a function of time, calculating $R^2$ from the least square difference of the linear fit over the defined time period of the loss of length of the components as a function of time and comparing the calculated value of $R^2$ with acceptable values of $R^2$ to determine if the quality of the friction weld is acceptable.

12 Claims, 2 Drawing Sheets

U.S. PATENT DOCUMENTS

| | | | |
|---|---|---|---|
| 7,080,770 B2 * | 7/2006 | Lovin et al. | 228/102 |
| 7,129,438 B2 * | 10/2006 | Bates et al. | 219/121.63 |
| 7,617,313 B1 * | 11/2009 | Washburn et al. | 709/224 |
| 7,651,019 B2 * | 1/2010 | Kyriakoglou | 228/112.1 |
| 2005/0040209 A1 | 2/2005 | Stotler et al. | |
| 2006/0043155 A1 | 3/2006 | Lovin et al. | |
| 2009/0092979 A1 * | 4/2009 | Danenberg | 435/6 |

FOREIGN PATENT DOCUMENTS

| | | |
|---|---|---|
| DE | 10 2004 030 381 B3 | 1/2006 |
| EP | 1 634 671 A3 | 3/2006 |
| GB | 1 293 141 | 10/1972 |
| GB | 1 439 277 A | 6/1976 |
| GB | 2 137 774 A | 10/1984 |
| WO | WO 2007/006669 A1 | 1/2007 |
| WO | WO 2009/146172 A3 | 12/2009 |

OTHER PUBLICATIONS

British Search Report dated Feb. 25, 2010 issued in British Patent Application No. 1002717.5.

Jun. 8, 2011 Search Report issued in European Patent Application No. 11153317.

* cited by examiner

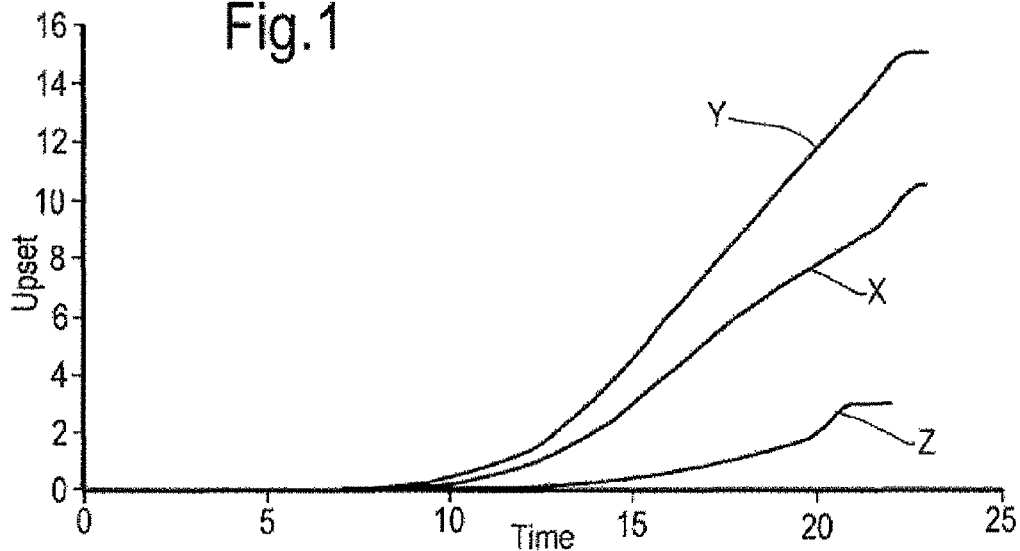
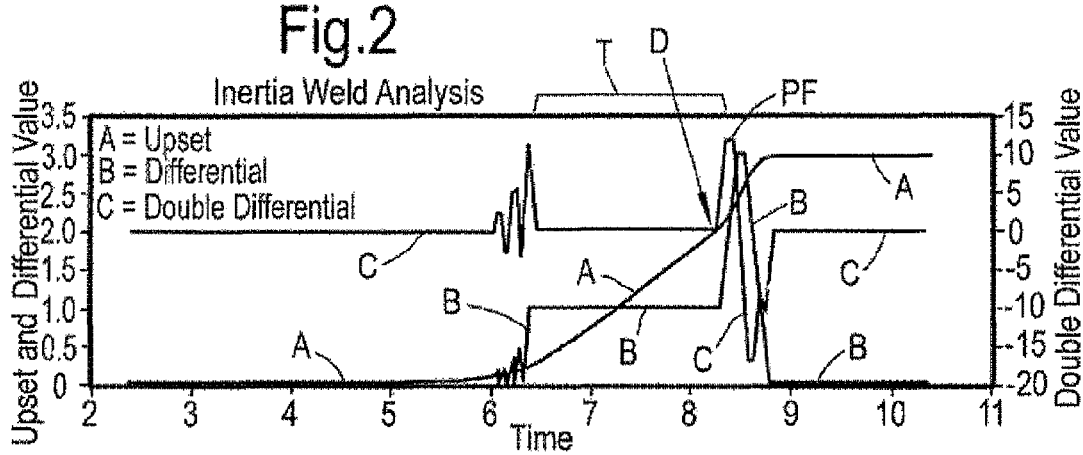
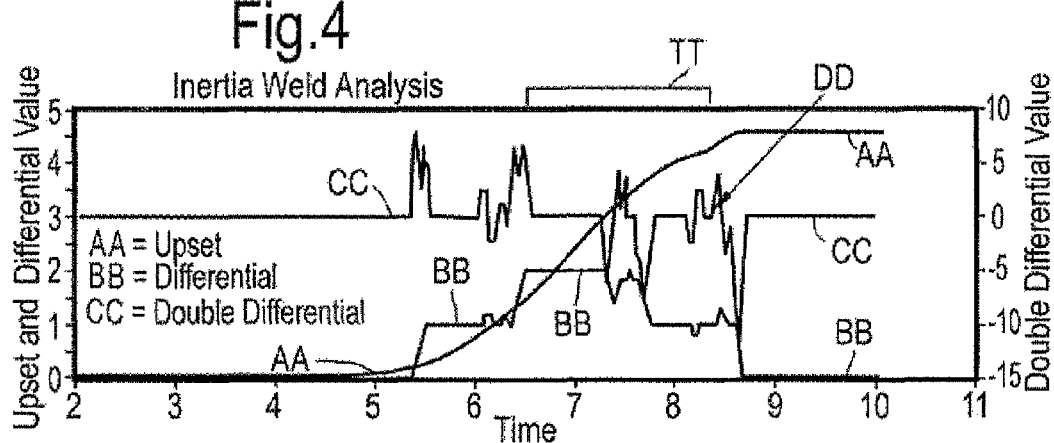

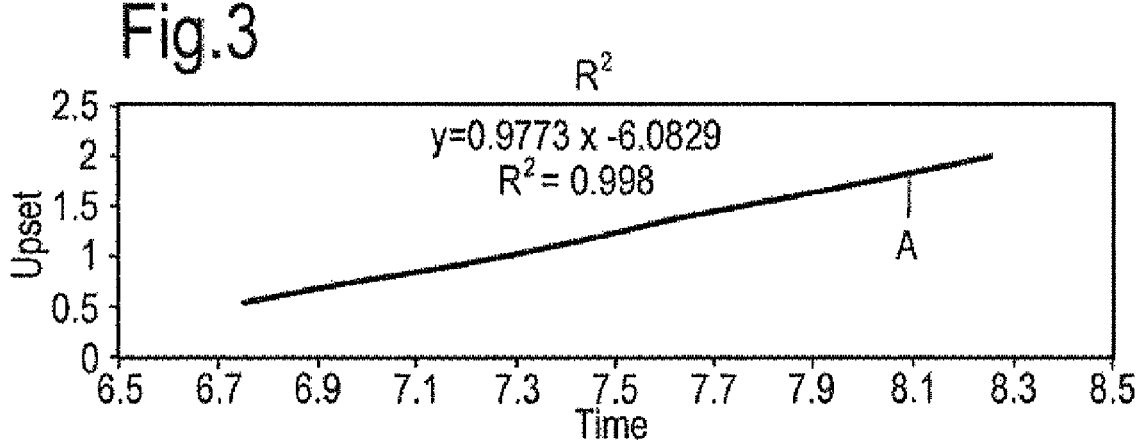
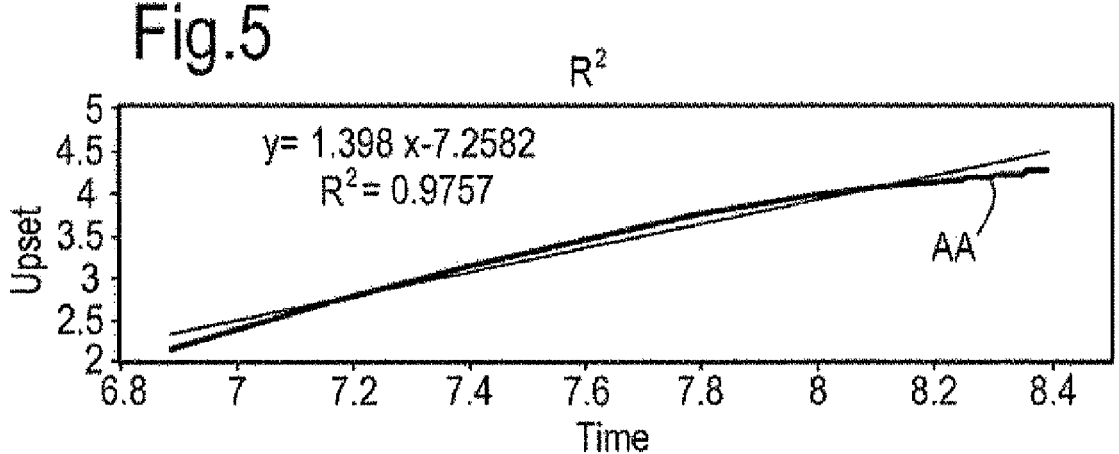
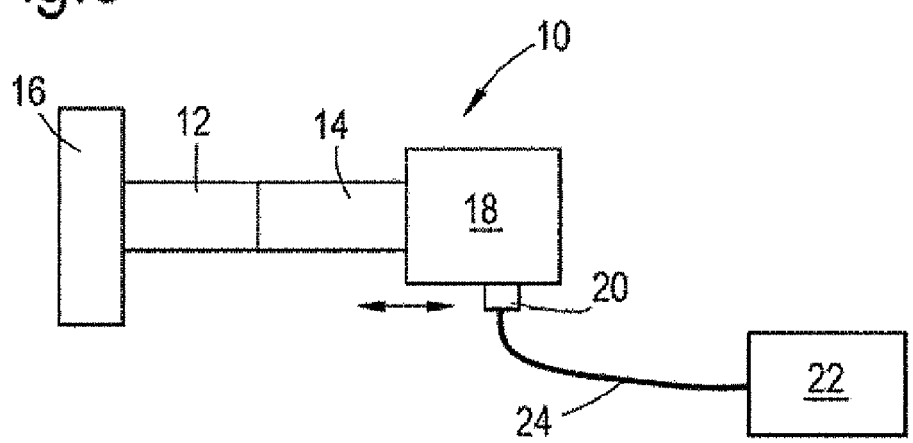

DETERMINING THE QUALITY OF A FRICTION WELD USING A DOUBLE DIFFERENTIAL

The present invention relates to an apparatus and a method of determining the quality of a friction weld, e.g. a linear friction weld, a rotary friction weld, an orbital friction weld and a stir friction weld. A rotary friction weld may be an inertia friction weld or a direct drive friction weld.

In an inertia friction welding process two relatively rotating components, either one static component and one rotating component or two components rotating in opposite directions, are brought into contact by an applied axial load/force. The inertia friction welding process causes a loss of length of the components, sometimes known as "burn-off" or "upset". During the inertia friction welding process initially the components are heated by the frictional heating to a critical forging temperature and once the critical forging temperature is reached the components start to lose length, undergo "burn-off" or "upset" and become shorter in length. Towards the end of the inertia friction welding process the rate of loss of length of the components may increase as a weld consolidation phase occurs.

It is known to monitor the inertia friction welding process by measuring the loss of length of the components with time and produce a graph, e.g. to monitor the rate of loss of length of the components.

Typically a stable inertia friction welding process, in equilibrium, will demonstrate a smooth rate of loss of length, or smooth "burn-off" rate. The shape and gradient of the loss of length against time curve, "burn off" rate, is also an indirect measure of the weld power dissipation, (heat flux), and is therefore a measure of the weld thermal history and hence dictates the weld microstructure and weld properties.

It is known to determine the quality of an inertia friction weld by comparing the measured rate of loss of length of the components during an inertia friction welding process with a range of acceptable rates of loss of length of the components e.g. to see if the rate of loss of length of the components falls between a maximum rate of loss of length of the components and a minimum rate of loss of length of the components. However, this does not take into account the linearity of the rate of loss of length of the components, or "burn-off" curve, that represents the stability of the power dissipation.

It is also known to determine the quality of an inertia friction weld by measuring the average rate of loss of length of the components, average "burn-off" rate, as a post inertia friction weld control, but this does not take into account any variation in the shape or linearity of the rate of loss of length of the components, or "burn-off" rate.

These prior art methods of determining the quality of an inertia friction weld do not distinguish, or highlight, non-uniformity or instability in the rate of loss of length of the components, e.g. the "burn-off" rate. It may be possible for non optimum inertia friction welds to be accepted without a measure of their quality using these prior art methods.

Gas turbine engine high temperature turbine disc alloys, or turbine disc superalloys, and other alloys with low hot working capability, may be prone to unstable "burn-off" rates at excessive power input rates as a result of excessively high weld pressure, or high machine load. In this case instantaneous plastic collapse may occur as a critical peak temperature is exceeded, which may lead to cracking, disbond and porosity. Also at moderately high weld pressure, or moderately high machine load, the value depends on the weld wall thickness, the rate of loss of length of the components, "burn-off" rate may slow down as the velocity of the advancing weld interface exceeds that of the conducting thermal heat front. Under the latter conditions a cold weld is formed and the rotational strain is not accompanied by the necessary axial shortening during the consolidation of the weld and strain induced cracking, or strain induced porosity may be formed.

The above conditions may not be determined by comparing the measured rate of loss of length of the components during an inertia friction welding process with a range of acceptable rates of loss of length of the components e.g. to see if the rate of loss of length of the components falls between a maximum rate of loss of length of the components and a minimum rate of loss of length of the components.

FIG. 1 shows a graph of loss of length of components versus time and curve X is a measured rate of loss of length of components, curve Y is a maximum rate of loss of length of the components and curve Z is a minimum rate of loss of length of the components.

Accordingly the present invention seeks to provide a novel method of determining the quality of a friction weld which reduces, preferably overcomes, the above mentioned problem.

Accordingly the present invention provides a method of determining the quality of a friction weld between two components, the method comprising joining two components together using a friction welding process, measuring the loss of length of the components as a function of time during the friction welding process, determining the quality of the friction weld by fitting a curve to the measured loss of length of the components as a function of time over a defined time period, determining the accuracy of fit of the curve to the measured loss of length of the components as a function of time, comparing the accuracy of the fit of the curve to the measured loss of length of the components as a function of time with acceptable values of accuracy to determine if the quality of the friction weld is acceptable.

Preferably the method comprises determining the quality of the inertia weld by calculating the $R^2$ value of the linear fit to the loss in length of the components as a function of time over the defined time period, calculating $R^2$ from the least square difference of the linear fit over the defined time period of the loss of length of the components as a function of time and comparing the calculated value of $R^2$ with acceptable values of $R^2$ to determine if the quality of the inertia weld is acceptable.

The above method is used where the loss of length of the components is linear and acceptable inertia weld quality is obtained.

Alternatively the method comprises determining the quality of the inertia weld by calculating the $R^2$ value of the non-linear fit to the loss in length of the components as a function of time over the defined time period, calculating $R^2$ from the least square difference of the non-linear fit over the defined time period of the loss of length of the components as a function of time and comparing the calculated value of $R^2$ with acceptable values of $R^2$ to determine if the quality of the inertia weld is acceptable.

The friction welding process may be linear friction welding, rotary friction welding, orbital friction welding or friction stir welding. The rotary friction welding may be inertia friction welding, direct drive rotary friction welding or hybrid rotary friction welding.

The linear friction welding process may comprise welding a blade to a rotor. The linear friction welding process may comprise welding a fan blade to a fan rotor, a compressor blade to a compressor rotor or a turbine blade to a turbine rotor.

The rotary friction welding process may comprise welding a first shaft to a second shaft, a first disc to a second disc or a shaft to a disc.

The friction welding process may comprise welding titanium alloy components, nickel superalloy components, steel components or any other suitable combination of alloys or metals.

The method may comprise determining the double differential with respect to time of the loss in length of the components as a function of time.

The method may comprise determining the end of the defined time period by identifying the start of the final positive peak of the double differential with respect to time of the loss of length of the components as a function of time.

The method may comprise determining the quality of the weld in real-time monitoring of the friction welding process and adjusting the friction welding process. The method may comprise monitoring the double differential with respect to time of the loss in length of the components to ensure it is within predefined limits for the friction weld.

The method may comprise determining that the double differential with respect to time of the loss of length of the components falls below a predefined lower limit for the friction weld and increasing the pressure and/or speed to bring the double differential with respect to time of the loss of length of the components back within the predefined limits for the friction weld.

The method may comprise determining that the double differential with respect to time of the loss of length of the components rises above a predefined upper limit for the friction weld and decreasing the pressure and/or speed to bring the double differential with respect to time of the loss of length of the components back within the predefined limits for the friction weld.

The present invention also provides an apparatus for determining the quality of a friction weld between two components, comprising an apparatus for friction welding two components together, a sensor to measure the loss of length of the components as a function of time during the friction welding process, a device to determine the quality of the friction weld by fitting a curve to the measured loss of length of the components as a function of time over a defined time period, a device to determine the accuracy of fit of the curve to the measured loss of length of the components as a function of time, a device to compare the accuracy of the fit of the curve to the measured loss of length of the components as a function of time with acceptable values of accuracy to determine if the quality of the friction weld is acceptable.

The present invention will be more fully described by way of example with reference to the accompanying drawings in which:—

FIG. 1 is a graph showing a method of determining the quality of an inertia friction weld according to the prior art.

FIG. 2 is a graph showing a method of determining the quality of a good inertia friction weld according to the present invention.

FIG. 3 is a graph showing the selected data for $R^2$ analysis in the method of determining the quality of a good inertia weld shown in FIG. 2.

FIG. 4 is a graph showing a method of determining the quality of a non optimum inertia friction weld according to the present invention.

FIG. 5 is a graph showing the selected data for $R^2$ analysis in the method of determining the quality of a bad inertia weld shown in FIG. 4.

FIG. 6 is a diagram showing an apparatus for friction welding a first component to a second component and an apparatus for determining the quality of the friction weld according to the present invention.

An apparatus 10, as shown in FIG. 6, for friction welding a first component 12 to a second component 14 comprises a first device 16 to rotate, or oscillate, the first component 12 and a second device 18 to hold the second component 14 rigidly. The second device 18 and the second component 14 are also arranged to be movable towards or away from the first component 12 such that the second component 14 is movable into contact with the first component 12 when the first component 12 is rotated, or oscillated, to generate heat by friction between the first component 12 and the second component 14 to produce a friction weld. Thus the apparatus 10 is arranged to produce a rotary friction weld or a linear friction weld between the first and second components 12 and 14.

The apparatus 10 also comprises a sensor 20 to measure the loss of length of the first and second components 12 and 14. The sensor 20 is electrically connected to a processor 22 by a means of data transfer 24, e.g. a cable or a wireless transmitter and receiver etc, and the processor 22 is arranged to receive a signal from the sensor 20 indicating the loss of length of the first and second components 12 and 14.

The processor 22 is arranged to determine the quality of the friction weld between the first and second components 12 and 14. The processor 22 measures the loss of length of the first and second component 12 and 14 as a function of time, as shown by line A in FIG. 2, during the friction welding process using the signal from the sensor 20. Then the processor 22 is arranged to determine the double differential with respect to time of the loss in length of is the first and second components 12 and 14 as a function of time, as shown by line C in FIG. 2. The differential with respect to time of the loss in length of the first and second components 12 and 14 as a function of time is also shown as line B in FIG. 2. The processor 22 is then arranged to determine the quality of the friction weld by fitting a predetermined polynomial function to the measured loss of length of the first and second components 12 and 14 as a function of time, as shown by line A over a defined time period T. The processor 22 determines the accuracy of fit of the predetermined polynomial function to the measured loss of length of the first and second components 12 and 14 as a function of time as shown by line A. The processor 22 determines the end of the defined time period T by identifying the start D of a final positive peak PF of the double differential with respect to time of the loss of length of the first and second components 12 and 14 as a function of time shown by line C. The defined time period depends on the particular welding application, e.g. the particular components being friction welded together. The defined time period may also be considered to be a defined distance. The processor 22 compares the accuracy of the fit of the predetermined polynomial function to the measured loss of length of the first and second components 12 and 14 as a function of time with acceptable values of accuracy to determine if the quality of the friction weld between the first and second components 12 and 14 is acceptable. The processor 22 is a PC, a microprocessor or any other suitable device.

FIGS. 2 and 3 show an example of a friction weld in which the weld has an acceptable upset curve, or loss of length of the first and second components as a function of time, whereas FIGS. 4 and 5 show an example of a friction weld in which the weld has an unacceptable upset curve, or loss of length of the first and second components as a function of time. It is seen in FIG. 4 that there are many positive and negative peaks in the double differential curve DD and the loss of length of the first and second components 12 and 14 as a function of time line AA does not show a linear portion whereas in FIG. 2 there are fewer positive and negative peaks in the double differential curve D and the loss of length of the first and second components 12 and 14 as a function of time line A a has much straighter portion.

The processor 22 determines the quality of the inertia friction weld by calculating the $R^2$ value of the linear fit to the loss in length of the components 12 and 14 as a function of time over the defined time period T, calculating $R^2$ from the least square difference of the linear fit over the defined time period T of the loss of length of the components 12 and 14 as a function of time and comparing the calculated value of $R^2$ with acceptable values of $R^2$ to determine if the quality of the inertia friction weld is acceptable. FIG. 2 provides a high $R^2$ fit, see FIG. 3, whereas FIG. 4 provides a lower $R^2$ fit, see FIG. 5.

The processor 22 uses the above method where the loss of length of the components 12 and 14 is linear and acceptable friction weld quality is obtained.

Alternatively the processor 22 determines the quality of the inertia friction weld by calculating the $R^2$ value of the non-linear fit to the loss in length of the components 12 and 14 as a function of time over the defined time period T, calculating $R^2$ from the least square difference of the non-linear fit over the defined time period T of the loss of length of the components 12 and 14 as a function of time and comparing the calculated value of $R^2$ with acceptable values of $R^2$ to determine if the quality of the friction weld is acceptable.

The processor 22 uses this method where the loss of length of the components 12 and 14 is non-linear and acceptable friction weld quality is obtained.

The method of least squares, also known as regression analysis, is used to compare the data of the loss of the length of the components as a function of time from the sensor with a straight line in linear least squares or a curve in non-linear least squares. The best fit of the data of the loss of the length of the components as a function of time to the straight line or curve is when the sum of the squares of the residuals, $R^2$, has its least value and a residual is the difference between a data point of the loss of the length of the components as a function of time and the straight line or curve used for the least squares method.

In the non-linear least squares method the curve may be a straight line, a parabola or any other polynomial type function.

Although the present invention has been described with reference to the use of the least squares method it is equally possible to use any other suitable method of regression analysis, for example the Lasso method.

The friction welding process may be linear friction welding, rotary friction is welding, orbital friction welding or friction stir welding. The rotary frictional welding may be inertia friction welding, direct drive friction welding (also known as continuous drive friction welding) or hybrid rotary friction welding. Hybrid rotary friction welding is a hybrid of inertia friction welding and direct drive friction welding.

The linear friction welding process may comprise welding a blade to a rotor. The linear friction welding process may comprise welding a fan blade to a fan rotor, a compressor blade to a compressor rotor or a turbine blade to a turbine rotor to make integrally bladed rotors, e.g. blisks or bladed disks, blings or bladed rings or blums or bladed drums, for gas turbine engines. The linear friction welding process may comprise welding a disc post to a disc. The linear friction welding process may comprise welding a fan disc post to a fan disc, a compressor disc post to a compressor disc or a turbine disc post to a turbine disc of gas turbine engines.

The rotary welding process may comprise welding a first disc to a second disc, a shaft to a disc or a first shaft to a second shaft.

The friction welding process may comprise welding titanium alloy components, nickel superalloy components, steel components or any other suitable combinations of alloys or metals.

The method may be used to determine the quality of the weld in real-time monitoring of the friction welding process and adjusting the friction welding process.

The value of $R^2$ calculated by the present invention may be related to the integrity/quality of the weld whereas previously no quantitative solution existed. The present invention provides a method of quantifying weld quality which may be automated allowing the determination of the acceptability of the friction weld without interpretation by a skilled operator.

Previously friction weld quality required manual and/or interpretation by a skilled operator. The present invention allows real-time monitoring of $R^2$ for upset control during the friction welding process in combination with pressure or speed modulation to accelerate or decelerate the loss of in length accordingly by using the real-time double differential calculation of the loss in length curve to dynamically control the upset such that the double differential is within predefined limits.

The start of the real time monitoring and the dynamic control of the upset may use one of four different possibilities depending upon the type of friction welding. The start of the dynamic control may be after a predetermined time, at a predetermined rotational speed, at a predetermined position (or upset or loss of length) or after a predetermined time for which the double differential with respect to time of the loss of length of the first and second components falls within predetermined upper and lower limits.

In the real time monitoring and dynamic control of the upset the double differential with respect to time of the loss of length of the components is monitored to ensure it is within predefined limits for that particular friction weld. If the value for the double differential with respect to time of the loss of length of the components goes outside the predefined limits for that particular friction weld the parameters, e.g. pressure and/or speed, of the friction weld are adjusted to bring the double differential with respect to time of the loss of length of the components back within the predefined limits for that particular friction weld. If the double differential with respect to time of the loss of length of the components falls below a predefined lower limit for that particular friction weld then the pressure and/or speed are increased to bring the double differential with respect to time of the loss of length of the components back within the predefined limits for that particular friction weld. If the double differential with respect to time of the loss of length of the components rises above a predefined upper limit for that particular friction weld then the pressure and/or speed are decreased to bring the double differential with respect to time of the loss of length of the components back within the predefined limits for that particular friction weld. The speed may be rotational speed for rotary friction welding or oscillation speed for linear friction welding. The predefined limits for that particular weld are within the acceptable limits for that particular weld such that excursions of the value of the double differential with respect to time of the loss of length of the components outside the predefined limits does not deleteriously affect the friction weld. Note in FIG. 2 the double differential curve C has a constant value of zero, or substantially zero, over the time period T for a linear acceptable upset rate. For a non-linear acceptable upset rate the double differential curve has constant value different to zero. The upper and lower predefined limits referred to are above and below these constant values.

The end of the real time monitoring and the dynamic control of the upset for inertia friction welding may use one of three different possibilities. Firstly, the end of the dynamic control may be after the speed of rotation reaches zero rpm or is within a predetermined range of zero rpm or the rotational speed reaches a predetermined value. Secondly, the end of the dynamic control may be after the time of the weld duration reaches a predetermined value. Thirdly, the end of the dynamic control may be after the upset or machine position has reached a predetermined value. Dynamic pressure control maintains the pressure that was applied when the predetermined value of the rotational speed is reached.

The invention claimed is:

1. A method of determining the quality of a friction weld between two components, the method comprising:
    joining two components together using a friction welding process,
    measuring the loss of length of the components as a function of time during the friction welding process,
    determining the quality of the friction weld by fitting a curve to the measured loss of length of the components as a function of time over a defined time period,
    determining the accuracy of fit of the curve to the measured loss of length of the components as a function of time over the defined time period,
    comparing the accuracy of the fit of the curve to the measured loss of length of the components as a function of time over the defined time period with acceptable values of accuracy to determine if the quality of the friction weld is acceptable,
    determining a double differential with respect to time of the loss of length of the components as a function of time,
    determining the end of the defined time period by identifying the start of a final positive peak of the double differential with respect to time of the loss of length of the components as a function of time.

2. A method as claimed in claim 1, further comprising:
    calculating an $R^2$ value of a linear fit to the loss of length of the components as a function of time over the defined time period,
    calculating the $R^2$ value from a least square difference of the linear fit over the defined time period of the loss of length of the components as a function of time, and
    comparing the calculated $R^2$ value with acceptable $R^2$ values to determine if the quality of the friction weld is acceptable.

3. A method as claimed in claim 1, further comprising:
    calculating an $R^2$ value of a non-linear fit to the loss of length of the components as a function of time over the defined time period,
    calculating the $R^2$ value from the least square difference of the non-linear fit over the defined time period of the loss of length of the components as a function of time, and
    comparing the calculated $R^2$ value with acceptable $R^2$ values to determine if the quality of the friction weld is acceptable.

4. A method as claimed in claim 1 wherein the friction welding process is selected from the group consisting of linear friction welding, rotary friction welding, and orbital friction welding.

5. A method as claimed in claim 4 wherein the rotary friction welding is selected from the group consisting of inertia friction welding, direct drive rotary friction welding and hybrid rotary friction welding.

6. A method as claimed in claim 4 wherein the linear friction welding process comprises welding a blade to a rotor.

7. A method as claimed in claim 6 wherein the linear friction welding process is selected from the group consisting of welding a fan blade to a fan rotor, welding a compressor blade to a compressor rotor and welding a turbine blade to a turbine rotor.

8. A method as claimed in claim 4 wherein the rotary friction welding process is selected from the group consisting of welding a first shaft to a second shaft, welding a first disc to a second disc and welding a shaft to a disc.

9. A method as claimed in claim 1 wherein the friction welding process is selected from the group consisting of welding titanium alloy components, welding nickel superalloy components, welding steel components and welding any other suitable combination of metals.

10. A method as claimed in claim 1 comprising monitoring the double differential with respect to time of the loss of length of the components to ensure it is within predefined limits for the friction weld.

11. A method as claimed in claim 10, further comprising:
    determining that the double differential with respect to time of the loss of length of the components falls below a predefined lower limit for the friction weld, and
    increasing the pressure and/or speed to bring the double differential with respect to time of the loss of length of the components back within the predefined lower limit for the friction weld.

12. A method as claimed in claim 10, further comprising:
    determining that the double differential with respect to time of the loss of length of the components rises above a predefined upper limit for the friction weld, and
    decreasing the pressure and/or speed to bring the double differential with respect to time of the loss of length of the components back within the predefined upper limit for the friction weld.

* * * * *